Figure 1:
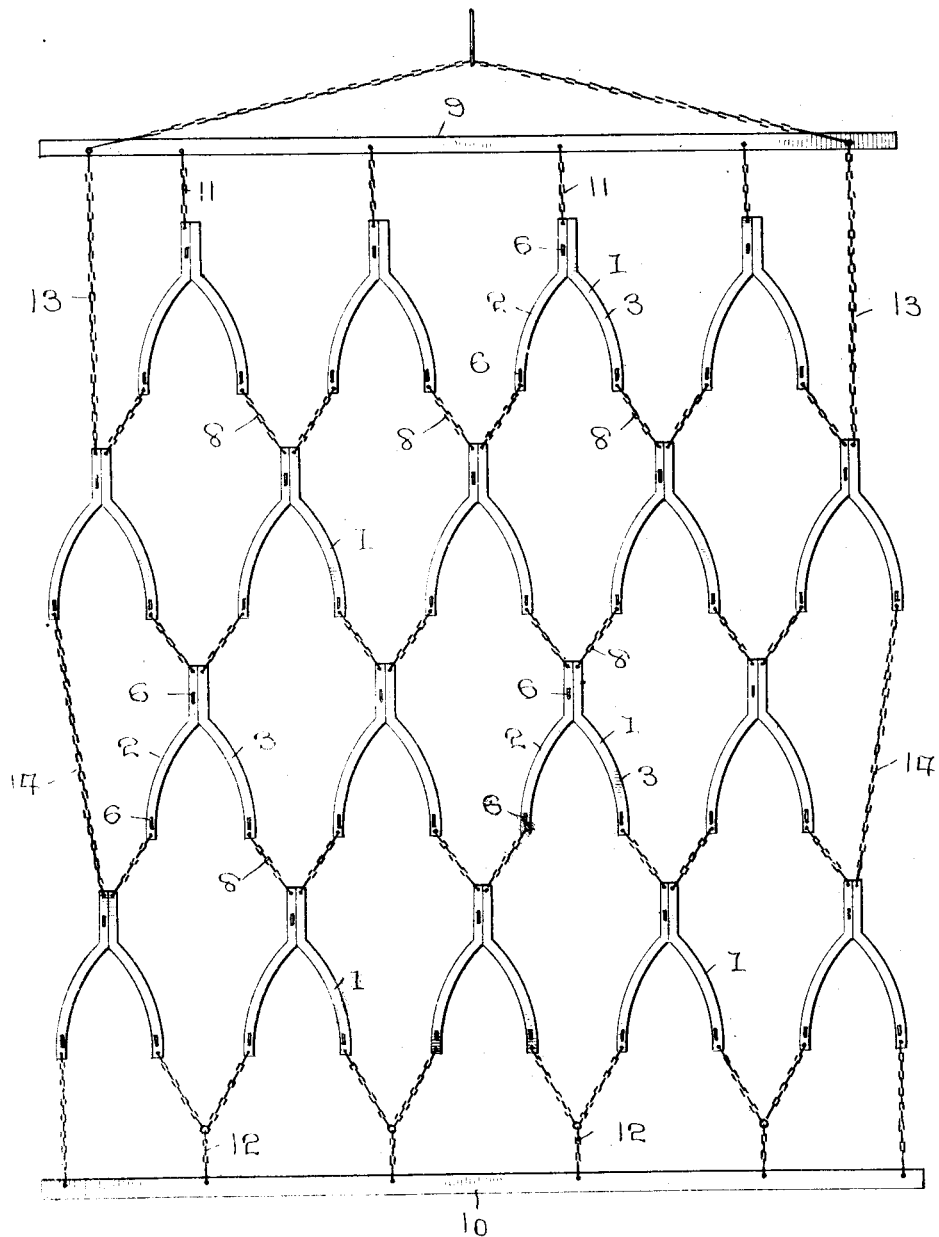

W. LUTZE.
FLEXIBLE HARROW.
APPLICATION FILED JULY 21, 1911.

1,069,557.

Patented Aug. 5, 1913.
2 SHEETS—SHEET 1.

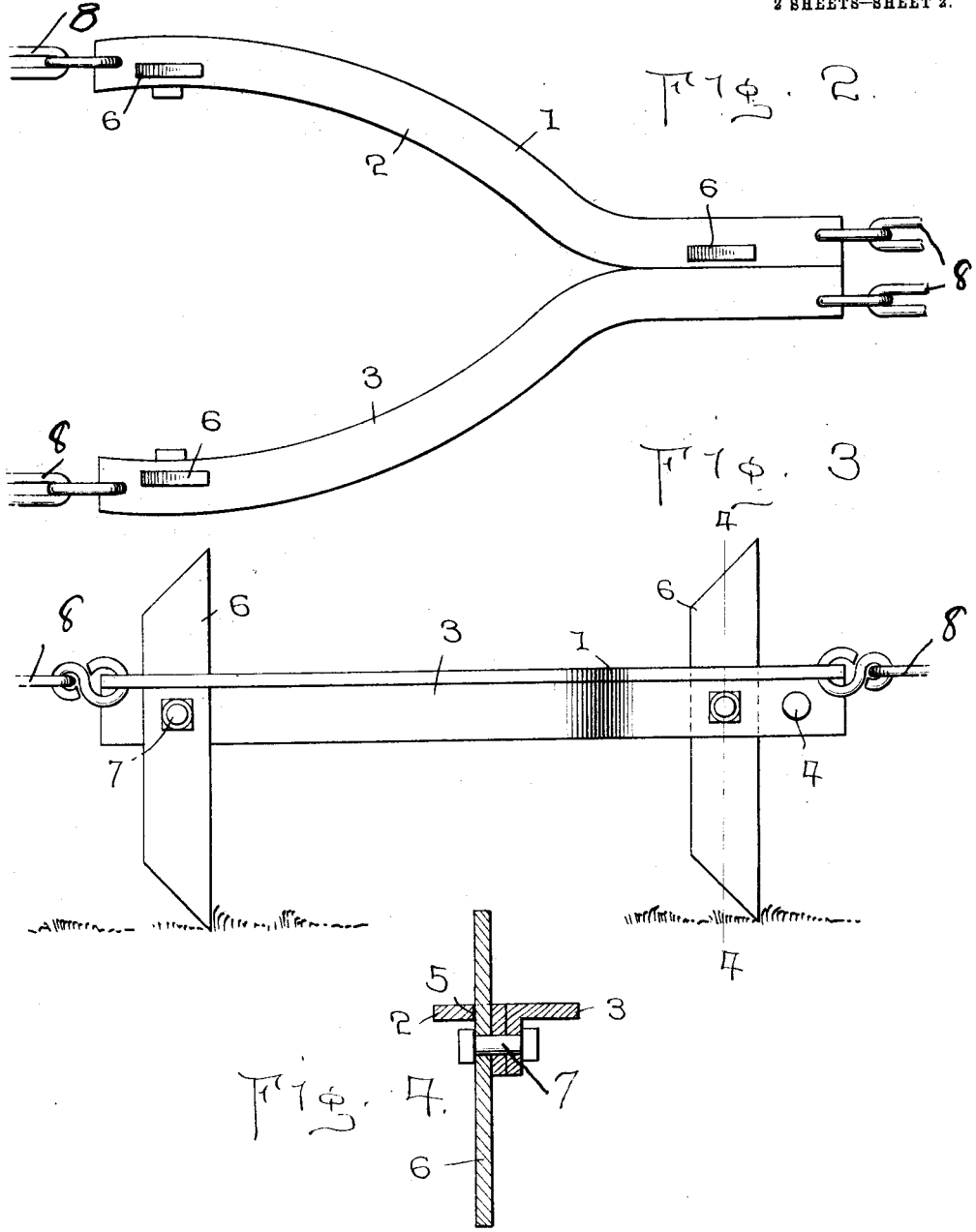

UNITED STATES PATENT OFFICE.

WILLIAM LUTZE, OF HOLYOKE, COLORADO.

FLEXIBLE HARROW.

1,069,557.   Specification of Letters Patent.   Patented Aug. 5, 1913.

Application filed July 21, 1911. Serial No. 639,824.

*To all whom it may concern:*

Be it known that I, WILLIAM LUTZE, a citizen of the United States, residing at Holyoke, in the county of Phillips and State of Colorado, have invented certain new and useful Improvements in Flexible Harrows; and I do hereby declare the following to be a full, clear, and exact description of the invention, such as will enable others skilled in the art to which it appertains to make and use the same.

My invention relates to new and useful improvements in harrows and my object is to provide a harrow in which the frame portions will be flexible.

A further object is to provide stay bars at the ends of the harrow to hold the frame sections in proper alinement.

A further object is to provide detachable teeth for the harrow, and, a still further object is to so arrange the teeth as to adapt them for deep or shallow cultivation.

Other objects and advantages will hereinafter be set forth and pointed out in the specification.

In the accompanying drawings, which are made a part of this application, Figure 1 is a top plan view of the harrow complete. Fig. 2 is an enlarged top plan view of one of the sections of the frame. Fig. 3 is an edge elevation thereof, and, Fig. 4 is a sectional view as seen on line 4—4 Fig. 3.

Referring to the drawings in which similar reference numerals designate corresponding parts throughout the several views, 1 indicates the frame sections of the harrow, which sections are preferably arranged in series, the first series comprising preferably four sections, the second series five sections, the third series four sections, and so on until the full complement of sections have been arranged, each section comprising a pair of bars 2 and 3, the forward ends of which are placed parallel with each other and secured together by means of rivets, bolts, or the like 4, while the rear portions of said bars are spread apart and describe an arc of a circle.

The bars 2 and 3 are preferably angular shaped in cross section the top or horizontal extension thereof having slots 5 therethrough, through which extend the harrow teeth 6, said teeth, when extended through the slots, resting against the vertical portion of the bars. The teeth 6 are secured to the vertical portions of the bars by means of bolts 7, one bolt being used for each tooth. The ends of the teeth are cut at an angle, the longer face of the teeth being toward the front of the harrow and by placing the holes through the teeth for the bolts 7 nearer one end of the teeth than the other, the greater portions of said teeth will project farther from the under-side of the frame sections while the smaller portions will project from the top or horizontal extension of the frame.

Each section of the frame is preferably provided with three of the teeth, one being placed at the forward end of the section and one at the rear end of each of the bars so that the forward tooth will engage the soil at a point substantially midway between the path of the two rear teeth and by placing the second series of teeth so that the forward end thereof will travel in a path at a point substantially midway between each pair of the preceding series of sections the soil will be thoroughly agitated. Each succeeding series of frame sections is attached to the preceding sections by means of chains or the like 8, there being two chains at the forward end of each frame section, one of which is engaged with one of the bars of the forward frame section and the other chain to the rear end of one of the bars of the next frame section in the series, and by thus spreading the chains and attaching them in the manner shown, the various frame sections will be properly guided with respect to each other while each frame section will be free to rise and fall in order to accommodate itself to the unevenness of the ground.

The forward and rear series of frame sections are attached to cross bars 9 and 10, through the medium of chain sections 11 and 12 respectively, said bars serving to properly spread the frame sections and prevent the same from becoming entangled or upset when turning the harrow. As each alternate series of frame sections is increased in number the frame sections at the ends of the larger series are properly guided by providing elongated chain sections 13 and 14, the chain sections 13 extending forwardly and engaging the cross bar 9 while the chain sections 14 extend from the forward ends of the two outermost frame sections of the rear series to the rear ends of the outermost bars of the two outside frame members of the larger series preceding the rearmost series.

If a deep cultivation is desired the harrow is positioned with the longer ends of the teeth projecting downwardly, but should a shallow cultivation be desired the frame sections are reversed, or turned upside down, thus presenting the shorter ends of the teeth to the surface to be cultivated and as this places the horizontal portions of the frame sections adjacent the soil they will serve as a drag to pulverize and level the soil. It will further be seen that as all the parts of the harrow are constructed of metal they will be practically indestructible from use, and it will likewise be seen that the teeth may be quickly removed and applied to use as but one bolt is required for holding the same in position.

What I claim is:

A harrow section substantially Y-shaped in form and consisting of companion angle bars having depending flanges secured in contacting relation to each other and providing cutting edge portions and horizontally disposed flanges, teeth carried by the contacting portions of said bars and by the ends thereof, said teeth being secured to said bars nearer their upper ends than their lower ends, and said section being reversible to bring the opposite ends of said teeth into engagement with the ground, whereby the horizontal flanges will serve as smoothing means and the vertical flanges as sod breaking means.

In testimony whereof I have signed my name to this specification in the presence of two subscribing witnesses.

WILLIAM LUTZE.

Witnesses:
GOTTLIEB SCHEUPKOTEN,
OTTO SCHROEDER.

Copies of this patent may be obtained for five cents each, by addressing the "Commissioner of Patents, Washington, D. C."